(12) United States Patent
Mendes Rodrigues et al.

(10) Patent No.: US 11,467,128 B2
(45) Date of Patent: Oct. 11, 2022

(54) DEFECT DETECTION USING ULTRASOUND SCAN DATA

(71) Applicant: FUJITSU LIMITED, Kawasaki (JP)

(72) Inventors: Eduarda Mendes Rodrigues, Northwood (GB); Serban Georgescu, London (GB)

(73) Assignee: FUJITSU LIMITED, Kawasaki (JP)

( * ) Notice: Subject to any disclaimer, the term of this patent is extended or adjusted under 35 U.S.C. 154(b) by 675 days.

(21) Appl. No.: 16/457,254

(22) Filed: Jun. 28, 2019

(65) Prior Publication Data

US 2019/0323993 A1 Oct. 24, 2019

Related U.S. Application Data

(63) Continuation of application No. PCT/EP2018/056231, filed on Mar. 13, 2018.

(30) Foreign Application Priority Data

Mar. 29, 2017 (EP) .................................... 17163582

(51) Int. Cl.
*G01N 29/06* (2006.01)
*G01N 29/40* (2006.01)
*G01N 29/44* (2006.01)

(52) U.S. Cl.
CPC ........... *G01N 29/069* (2013.01); *G01N 29/40* (2013.01); *G01N 29/449* (2013.01); *G01N 29/4454* (2013.01); *G01N 2291/044* (2013.01)

(58) Field of Classification Search
CPC .. G01N 29/069; G01N 29/40; G01N 29/4454; G01N 29/449
See application file for complete search history.

(56) References Cited

U.S. PATENT DOCUMENTS

| 3,733,891 A | 5/1973 | Weighart |
| 4,088,028 A | 5/1978 | Hildebrandt |

(Continued)

FOREIGN PATENT DOCUMENTS

| JP | 2011-203037 | 10/2011 |
| JP | 2014-54362 | 3/2014 |

OTHER PUBLICATIONS

International Search Report dated May 29, 2018 in corresponding International Application No. PCT/EP/2018/056231.

(Continued)

*Primary Examiner* — Bryan Bui
(74) *Attorney, Agent, or Firm* — Staas & Halsey LLP

(57) ABSTRACT

A defect detection method and apparatus detecting a defect in an object. The method comprises: obtaining ultrasound scan data derived from an ultrasound scan of the object under consideration, the ultrasound scan data being in the form of a set of echo amplitude values representing the amplitude of echoes received from the object during ultrasound scanning at certain spatial and temporal points; processing the ultrasound scan data to remove echo amplitude values received after a predetermined threshold time; generating at least one image from the processed ultrasound scan data; subjecting each generated image to an automated defect recognition process to determine whether there is a defect in the portion of the object represented by the image; issuing a notification indicating whether or not a defect has been found; and, if a defect has been found, storing the result of the automated defect recognition process in a defect database.

9 Claims, 11 Drawing Sheets

(56) References Cited

U.S. PATENT DOCUMENTS

| | | | |
|---|---|---|---|
| 4,147,065 | A | 4/1979 | Lather et al. |
| 4,150,577 | A | 4/1979 | Fetheroff |
| 4,432,235 | A | 2/1984 | Renzel et al. |
| 4,492,118 | A | 1/1985 | Bäthmann |
| 8,131,107 | B2 * | 3/2012 | Sun .......................... G06T 7/35 382/272 |
| 2009/0279772 | A1 | 11/2009 | Sun et al. |
| 2011/0232386 | A1 | 9/2011 | Ito et al. |
| 2013/0060488 | A1 | 3/2013 | Ghabour et al. |
| 2016/0054266 | A1 | 2/2016 | Ozeki et al. |
| 2016/0202213 | A1 | 7/2016 | Volker et al. |
| 2018/0299412 | A1 * | 10/2018 | Mendes Rodrigues ..................... G01N 29/4472 |

OTHER PUBLICATIONS

Japanese Office Action dated Aug. 11, 2020 in Japanese Patent Application No. 2019-533509.

* cited by examiner

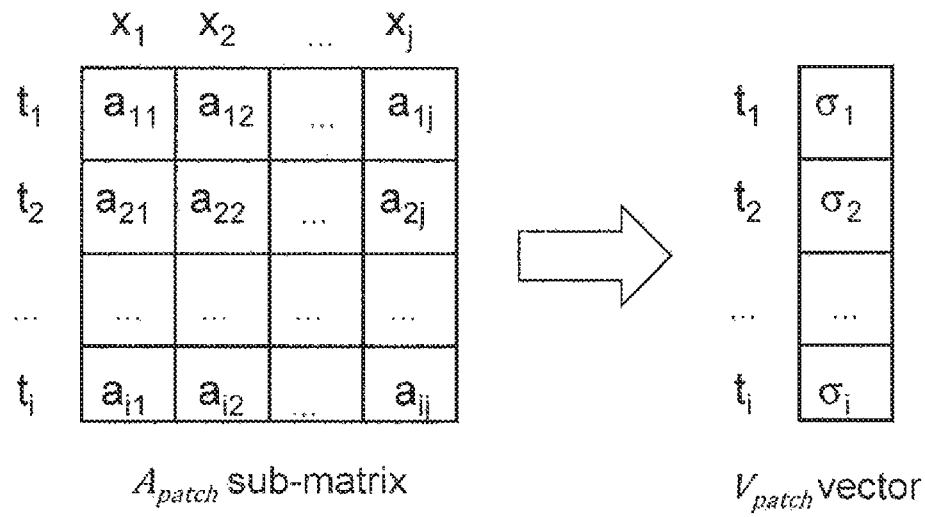
$A_{patch}$ sub-matrix
FIG. 3(a)
$V_{patch}$ vector
FIG. 3(b)
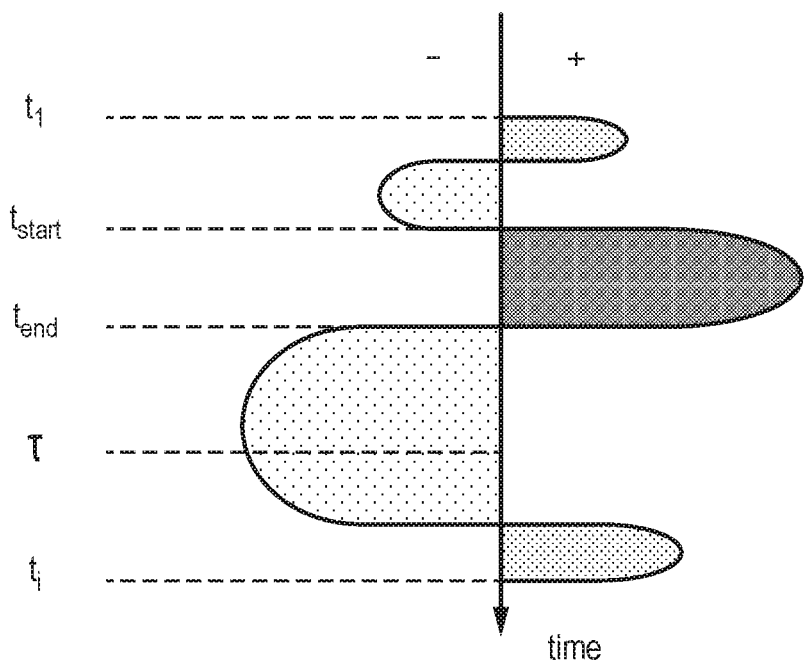
FIG. 4

DEFECT DETECTION USING ULTRASOUND SCAN DATA

CROSS-REFERENCE TO RELATED APPLICATIONS

This application is based on and hereby claims priority to International Application No. PCT/EP2018/056231 filed on Mar. 13, 2018 and European Application No. 17163582.4, filed Mar. 29, 2017, in the European Intellectual Property Office, the disclosures of which are incorporated herein by reference.

BACKGROUND

Field

Embodiments of the present invention relate to defect detection using ultrasound scan data.

Description of the Related Art

Ultrasonic non-destructive testing (NDT) is a non-invasive technique that is used for determining the integrity of materials, such as fiberglass used in manufacturing, or structures, and enables the detection of internal defects in the test object. In this technique, one or more ultrasound probes emit sound waves that propagate inside the object and receive the echoes resulting from interactions with the internal structures. The distance of the reflector material can be accurately estimated based on the speed of the sound wave.

Signals caused by reflections due to flaws, such as discontinuities, wrinkles, trapped objects, air pockets, etc., can be identified in the scans. This technique is widely used in industry as part of manufacturing quality control processes. Currently the detection is a manual process, involving a thorough visual inspection of each section of the scan. Depending on the dimensions of the test object, a trained operator can spend several hours looking through visualisations of the scans in order to identify regions of the structure that may have defects and require physical inspection. The operator uses visual cues, such as structure curvatures or discontinuities, to flag potential defects. This is done through interactive visualisation of the raw scan data, which enables adjustment of saturation thresholds, zooming, etc. Although the operators are highly-trained, the inspection is not guaranteed to have full coverage of all defects due to noise in the raw data, resulting from the propagation of echoes, and/or issues with the visualisation.

A previously-proposed method aims to facilitate automatic recognition of defects in quality control processes by employing a machine learning-based defect recognition process in which a machine, trained to recognize defects in materials/structures, identifies defects based on ultrasound image data of the material or structure. By automating the initial part of the inspection process in this way, quality control engineers/technicians can complete their inspections in more efficient ways, taking less inspection time per test object and hence reducing the overall human effort and costs. However, the accuracy of such a machine learning-based defect recognition process is dependent upon the quality of the image data it is processing. In particular, it is important, when converting the raw scan data to image data for the machine learning-based defect recognition process, that features of interest in the raw scan data are accurately represented in the image data whilst also ensuring that unwanted data such as noise is removed.

It is therefore desirable to provide an improved defect detection method and apparatus using images derived from ultrasound scan data.

SUMMARY

According to an embodiment of a first aspect of the present invention there is provided a defect detection method for detecting a defect in an object, wherein the method comprises: obtaining ultrasound scan data derived from an ultrasound scan of the object under consideration, the ultrasound scan data being in the form of a set of echo amplitude values representing the amplitude of echoes received from the object during ultrasound scanning at certain spatial and temporal points; processing the ultrasound scan data to remove echo amplitude values received after a predetermined threshold time; generating at least one image from the processed ultrasound scan data; subjecting each generated image to an automated defect recognition process to determine whether there is a defect in the portion of the object represented by the image; issuing a notification indicating whether or not a defect has been found; and, if a defect has been found, storing the result of the automated defect recognition process in a defect database.

Embodiments may provide an automatic method to create a visual representation of NDT ultrasound data which is more suitable for a quality control machine learning process. In such embodiments image "patches" of specific data samples are generated from the full scan data after removing irrelevant data such as noise in such a way as to preserve data relating to relevant structures of the scanned object. The image patches are applied as input for automated defect detection (for example, using a machine learning process), thereby improving the accuracy of the defect detection process and reducing the amount of time required by the operator to complete the quality control process.

The method may further comprise dividing the set of echo amplitude values into a plurality of sub-sets before the processing of the ultrasound scan data, and, in the processing, removing the echo amplitude values received after the predetermined threshold time from each subset.

Processing the ultrasound scan data may include determining the value of the threshold time to be used. Determining the value of the threshold time may comprise: for each sub-set, deriving from the amplitude values in the sub-set a vector comprising a representative amplitude value for each time point in the sub-set. The end time point of the largest sequence of positive representative amplitude values in each vector may be identified. From amongst all the end time points identified for the vectors, the end time point with the greatest value, or a value calculated using that end time point, may be selected as the value of the threshold time.

In an embodiment deriving a vector may comprise applying a mathematical function, comprising an aggregation function, to those amplitude values in the sub-set which correspond to echoes received at the same time. The mathematical function may further comprise a smoothing function.

The object under consideration may be at least one of: a manufactured object; and an object used in manufacture.

An embodiment may further comprise using a defect detected in the object to determine at least one of: the structural integrity of material forming at least part of the object; and flaws in material forming at least part of the object.

According to an embodiment of a second aspect of the present invention there is provided a computer program which, when run on a computer, causes that computer to carry out a method embodying the first aspect.

According to an embodiment of a second aspect of the present invention there is provided a defect detection apparatus to detect a defect in an object, the apparatus comprising: an ultrasound scan data processor to process ultrasound scan data derived from an ultrasound scan of the object under consideration, the ultrasound scan data being in the form of a set of echo amplitude values representing the amplitude of echoes received from the object during ultrasound scanning at certain spatial and temporal points, the ultrasound scan data processor comprising: an amplitude filter to remove from the ultrasound scan data echo amplitude values received after a predetermined threshold time; and an image generator to generate at least one image from the filtered ultrasound scan data; and a defect detector to perform on each generated image an automated defect recognition process to determine whether there is a defect in the portion of the object represented by the image, issue a notification indicating whether or not a defect has been found, and, if a defect has been found, store the result of the automated defect recognition process in a defect database.

The ultrasound scan data processor may include a data sub-set creator to divide the set of echo amplitude values into a plurality of sub-sets before the processing of the ultrasound scan data by the amplitude filter, the amplitude filter removing the echo amplitude values received after the predetermined threshold time from each subset.

The ultrasound scan data processor may include a threshold determiner to determine the value of the threshold time to be used. The threshold determiner may determine the value of the threshold time to be used by: for each sub-set, deriving from the amplitude values in the sub-set a vector comprising a representative amplitude value for each time point in the sub-set; identifying in each vector the end time point of the largest sequence of positive representative amplitude values; and selecting, from amongst all the end time points identified for the vectors, the end time point with the greatest value, or a value calculated using that end time point, as the value of the threshold time.

The threshold determiner may derive a vector by applying a mathematical function, comprising an aggregation function, to those amplitude values in the sub-set which correspond to echoes received at the same time. The mathematical function may further comprise a smoothing function.

Embodiments are particularly (but not exclusively) useful when applied to the analysis of NDT ultrasound images where the test object includes a large structure such as a back wall.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

These and/or other aspects and advantages will become apparent and more readily appreciated from the following description of the embodiments, taken in conjunction with the accompanying drawings.

Reference will now be made, by way of example, to the accompanying drawings, in which:

FIG. 3(a) illustrates a sub-matrix $A_{patch}$ derived in the patch filtering process;

FIG. 3(b) illustrates a vector $V_{patch}$ derived from the sub-matrix $A_{patch}$;

FIG. 4 is a plot of the values of the vector $V_{patch}$ after application of an amplitude transform;

DETAILED DESCRIPTION

Figure 1A:
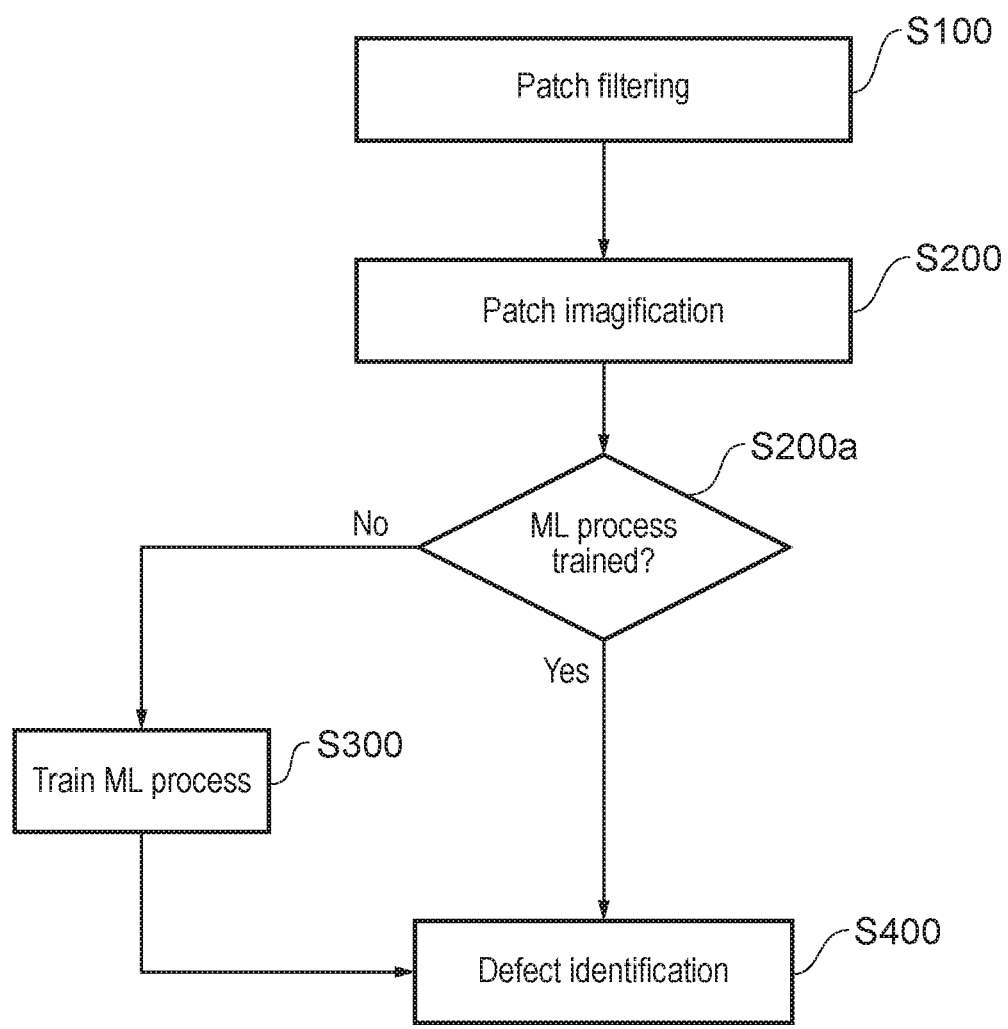
FIG. 1A is a flowchart for use in explaining a method according to an embodiment.

Reference will now be made in detail to the present embodiments of the present invention, examples of which are illustrated in the accompanying drawings, wherein like reference numerals refer to the like elements throughout. The embodiments are described below to explain the present invention by referring to the figures. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

A flowchart of an embodiment is shown in FIG. 1A. At operation S100 the embodiment employs an ultrasound scan data sampling process, i.e. patch filtering process 100, and at operation S200 a process of representing the ultrasound scan data as a collection of images, i.e. patch imagification process 200. The images thus produced are used in operation S400 as input in a machine learning (ML) process 400 for automated defect detection. If the ML model has not yet been trained (no, operation S202a), the ML model is first trained on known defect image data in a training process 300 at operation S300.

Figure 1B:
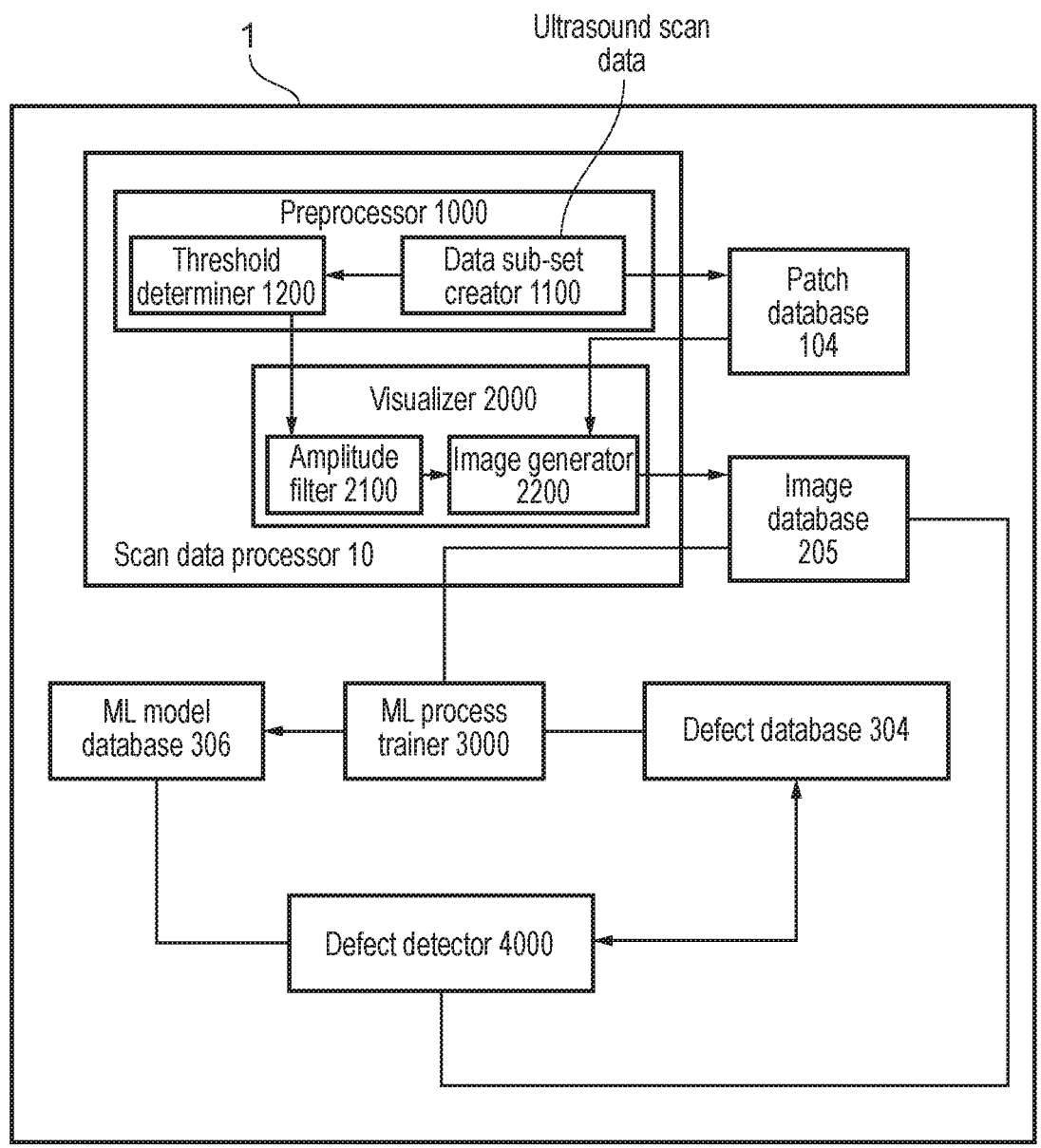
FIG. 1B is a block diagram of apparatus according to an embodiment.

The operations shown in FIG. 1A may for example be carried by apparatus 1 as shown in FIG. 1B. Apparatus 1 comprises an ultrasound scan data processor 10, configured to process ultrasound scan data by carrying out patch filtering process 100 and patch visualisation process 200, a patch database 104 configured to store patches created in patch filtering process 100, an image database 205 configured to store images created in patch imagification process 200, an ML process trainer 3000 configured to train the ML model using known defects stored in a defect database 304, an ML model database 306 configured to store the trained ML model, and a defect detector 4000 configured to carry out defect detection process 400 by inputting the images stored in the image database 205 to the trained ML model so as to identify defects in the structures represented by the images and add identified defects to the defect database 304.

Ultrasound scan data processor 10 includes a pre-processor 1000, comprising a data subset creator 1100 and a threshold determiner 1200, configured to carry out the patch filtering process 100. Ultrasound scan data processor 10 also includes a visualiser 2000, comprising an amplitude filter 2100 and an image generator 2200, configured to carry out the patch visualisation process 200.

The patch filtering process 100 takes samples of raw scan data and transforms them to determine a threshold for use in the amplitude filter; the amplitude filter is then used in a patch imagification process 200 which converts the filtered samples to image representations. The full scan data may be represented as a data matrix of sound wave echo amplitudes, where each row of the matrix corresponds to the echo measured at a given time $t_j$, and each column of the matrix corresponds to the physical distance $x_i$, from the tip of the scanned object to the position where the measurement was taken. Each data sample is a sub-matrix that will be converted into an image representation after the amplitude filter is applied. The amplitude transform applies, on a row by row basis, an aggregation function to the amplitude measurements to identify a threshold along the t dimension, which can be used to separate salient structures of the scanned object from the signal echoes. By applying the aggregation function on a row by row level echoes corresponding to a salient structure of an object, such as its back wall where critical defects tend to be observed, can be separated out more reliably. When visualized, such an echo stands out as a salient structure along the x axis. The patch filtering process identifies an overall threshold $t_{scan}$ that is applied in the patch imagification process to filter out rows of data corresponding to noise before imagification of the data.

Figure 2:
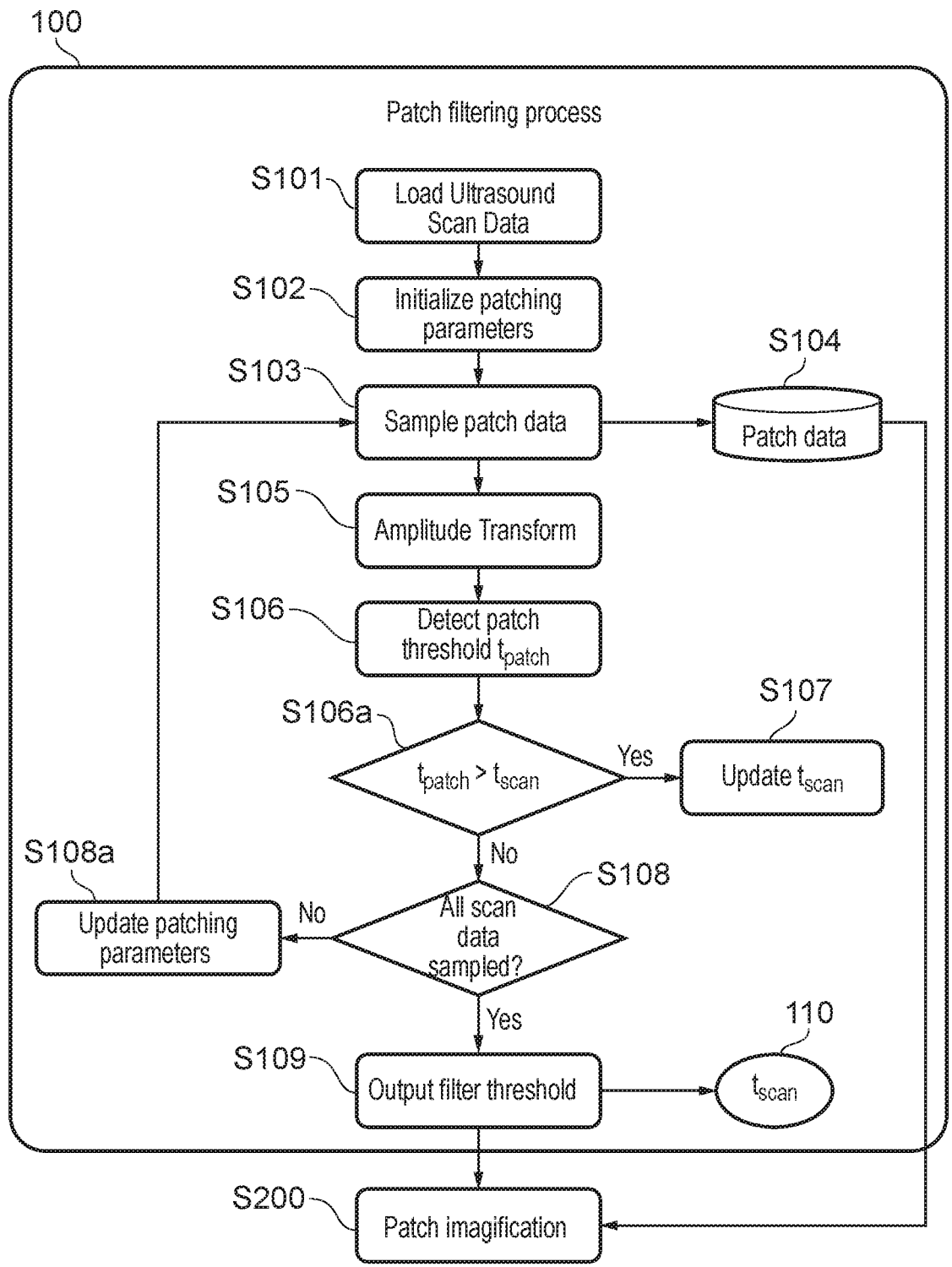
FIG. 2 is a flowchart of a patch filtering process used in an embodiment.

As shown in FIG. 2, the patch filtering process (100) depicted at operation S100 of FIG. 1 starts at operation S101 by loading the measurements of an ultrasound scan in its raw data format. The raw scan data can, for example, be represented as a matrix $A_{raw}$ or another two-dimensional data structure, comprising amplitudes of the echo signals along two dimensions: x, the distance from the tip of scanned object, and t, the time elapsed since the sound wave was emitted and the echo signal amplitude was measured.

As mentioned above, the patch filtering process 100 aims to determine an optimum threshold value $t_{scan}$, for filtering out irrelevant scan data, i.e. for eliminating data points where the value of t exceeds the threshold $t_{scan}$. Such irrelevant data correspond to ultrasound signal echoes that are not useful for the defect analysis, such as noise. At operation S102 of FIG. 2 the value of $t_{scan}$ is initialized to 0 and an initial set of parameters $x_0$, $x_{step}$, $x_{overlap}$ is set. The parameters are used in operation S103 to sample the raw scan data by selecting a sub-matrix $A_{patch}$ (i.e. a subset of rows and columns of the raw data matrix $A_{raw}$ containing echo amplitude values for each pair $(x_i, t_j)$ included in the sampled patch) as shown in FIG. 3(a), such that for each pair $(x_i, t_j)$ of the sub-matrix $A_{patch}$ two conditions are observed: $x_0 \leq x_i < x_0 + x_{step}$.

The raw scan sub-matrix $A_{patch}$ is first saved in operation S104 for the subsequent patch imagification process S200, and then in operation S105 is processed using an amplitude transform, in the form of a function that is applied to the amplitude values in each row $t_i$, to obtain a vector $V_{patch}$ ($\sigma_1$, $\sigma_2$, $\sigma_3$, . . . , $\sigma_i$), as shown in FIG. 3(b). The function comprises an aggregation function (e.g. sum, average, etc.) which aggregates the amplitude values. An example of such a function is shown below at equation (1), which is a weighted sum of the amplitude values of each row of the matrix $A_{patch}$. In the case of a simple sum, the values of $w_i$ are all equal to 1. In the case of a simple average $w_i$ are all equal to 1/N, where N is the number of columns of the matrix $A_{patch}$.

$$V_{patch}(t_j) = \sigma_j = \sum_{x_i \in X_{patch}} w_i \cdot A_{patch}(x_i, t_j) \quad (1)$$

In addition the function may include a smoothing function, such as a convolution filter, to smooth the values $\sigma_j$ (smoothing is applied to reduce the effect of neighbouring elements in the vector Vpatch, having very different amplitude values). For example, the convolution filter could correspond to a moving average with a window size $w_{size}$ much smaller than the maximum value of t, $t_{max}$ (e.g. 5% of $t_{max}$).

FIG. 4 is a plot of the values of the vector $V_{patch}$ after the amplitude transform has been applied. In the vector $V_{patch}$ the largest sequence of positive values in $V_{patch}$, i.e. that shown from $t_{start}$ to $t_{end}$, corresponds to the largest salient feature (normally the text object back wall).

In operation S106 a patch threshold value $t_{patch}$ along the time dimension, which corresponds to the end $t_{end}$ of the largest sequence, is determined. Considering the visualisation of this vector presented in FIG. 4, the patch threshold value is defined as $t_{patch} = t_{end} + w_{size}$ (in the case that a convolution filter with window size $w_{size}$ has been used; if not, $t_{patch} = t_{end}$), where $t_{end}$ is the last value of t of the positive sequence with the largest area under the curve. The area under the curve for a given sequence can be calculated precisely or approximated as the sum of amplitudes between $t_{start}$ and $t_{end}$, i.e. as shown in equation (2):

$$auc \approx \sum_{t=t_{start}}^{t_{end}} V_{patch}(t) \quad (2)$$

A maximum value of t, $t=\tau$, may be predefined in cases where an upper bound for filtering can be pre-set, for example by a user based on domain knowledge. In such cases, if $t_{end} + w_{size} > \tau$, then the patch threshold value is set to $t_{patch} = \tau$. In this case $t_{scan}$ is always equal to $\tau$.

In operation 106a the patch threshold value $t_{patch}$ for the vector currently being processed is compared to the current overall scan threshold $t_{scan}$, and, if $t_{scan}$ is lower than $t_{patch}$ (Yes, operation S106a), $t_{scan}$ is then updated to the current value of $t_{patch}$. in operation S107. After comparing $t_{patch}$ and $t_{scan}$, and if necessary updating $t_{scan}$, the process checks at operation S108 if all scan data has been sampled. If not (No, operation S108), in operation S108a the sampling window is updated to values of $x_{next} = x_{previous} + x_{step} - x_{overlap}$ and the process returns to operation S103 to sample the next patch data, and iterates until the full raw data matrix has been processed (Yes, operation S108). The output of the patch filtering process at operation S109 is the overall final value of the scan threshold $t_{scan}$ (shown at S110).

Figure 5:
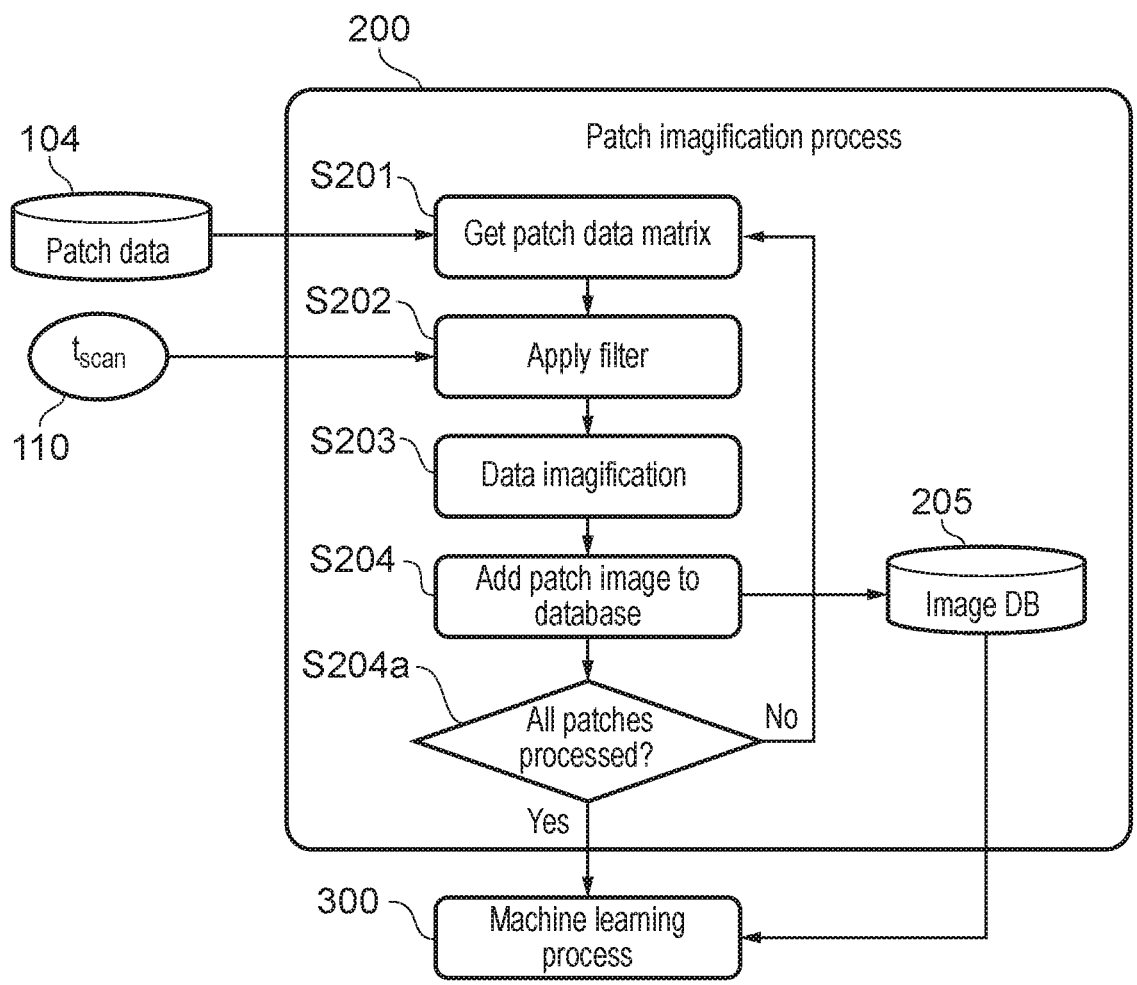
FIG. 5 is a flowchart of a patch imagification process used in an embodiment.
Figure 6:
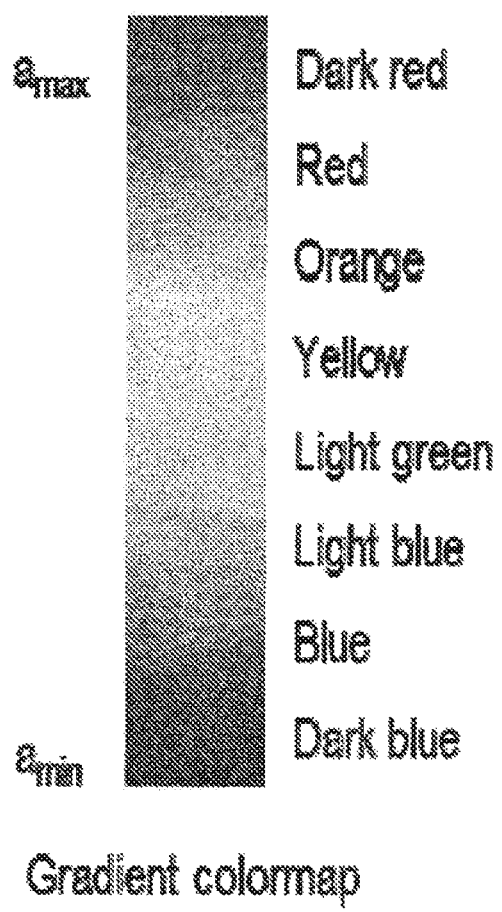
FIG. 6 is a gradient colormap used in an embodiment.

Following completion of the patch filtering process 100, a patch imagification process 200, depicted in FIG. 5, is carried out. The patch imagification process 200 aims to create optimised scan image patches for use as input for a subsequent machine learning defect detection process. In operation S201 of the patch imagification process 200 a raw scan sub-matrix $A_{patch}$ stored at operation S104 of the patch filtering process 100 is retrieved and then, at operation S202, all the rows of that raw scan sub-matrix $A_{patch}$ for which the value of t is higher than $t_{scan}$ are eliminated. A data imagification process is then applied to thus filtered sub-matrix at operation S203, in which data imagification process the scan data is visualised by converting the raw data of the filtered sub-matrix to an image, and at operation S204 the resulting image is added to an image patch database 205 for subsequent analysis. For example, the data imagification process may comprise mapping each amplitude value in the raw scan data of the filtered sub-matrix to an RGB colour determined by a fixed colour gradient, for example a colour gradient such as that shown (in black and white) in FIG. 6 that ranges from dark blue for the minimum amplitude to dark red for the maximum amplitude. In this case the resulting image is a pixel-map where the colour of each pixel encodes an amplitude value. At operation S204a a determination is made as to whether all the raw scan sub-matrices $A_{patch}$ stored at operation S104 have been processed. If not (No, operation S204a) the process returns to operation S201 and the process is then iterated until all the raw scan sub-matrices $A_{patch}$ have been processed (Yes, operation S204a), at which point the machine learning process may begin.

Figure 7:
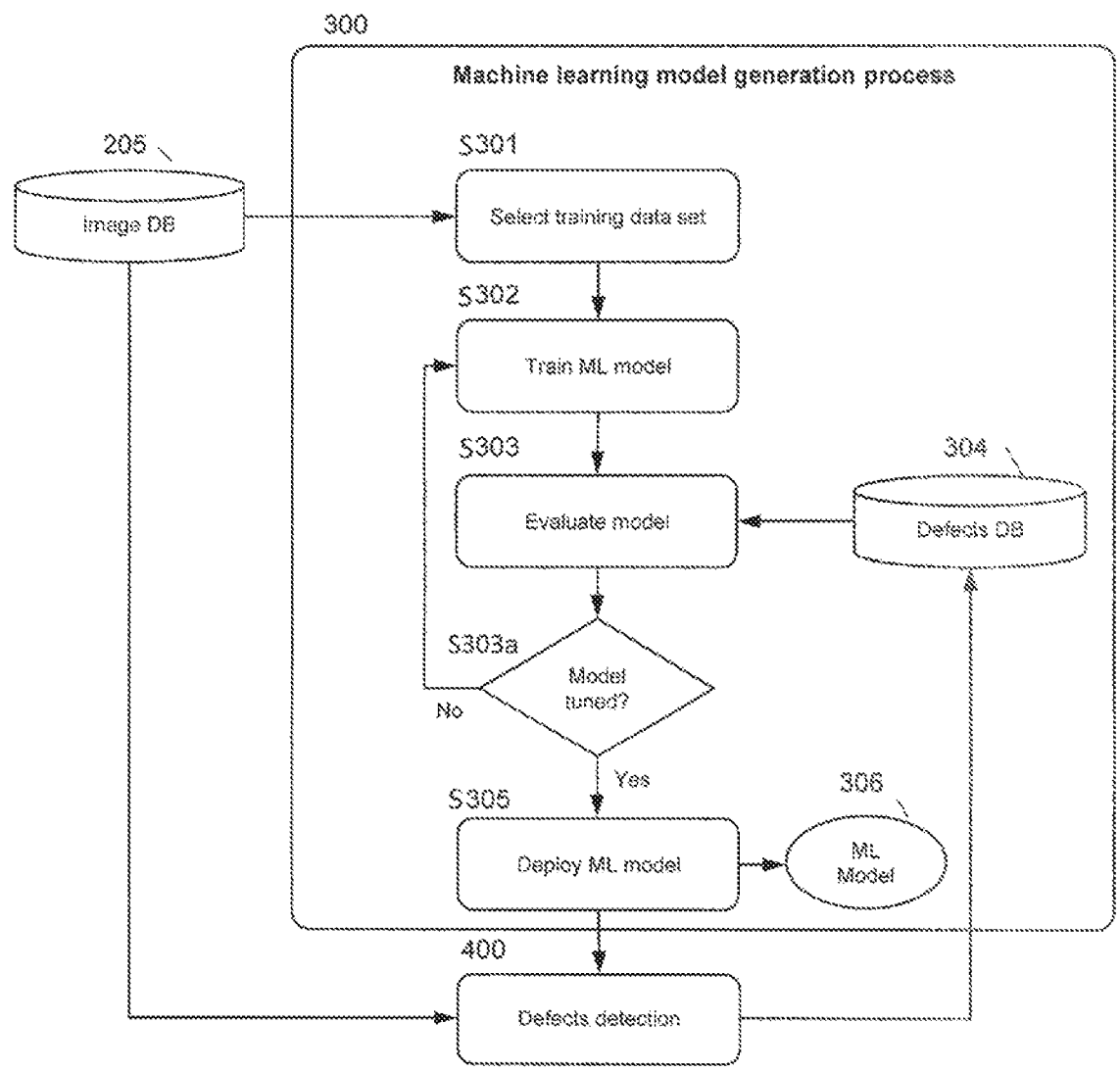
FIG. 7 is a flowchart of a machine learning model generation process used in an embodiment.

Defect detection may be achieved by applying one of several known image analysis methods, for example a standard machine learning (ML) model, which may utilize a convolutional neural network. The ML model may be pre-trained on external image databases, in which case a pre-trained convolutional neural network performs feature vector extraction and applies a simple classifier, like k-Nearest Neighbours, to identify similar image patches based on the similarity of the extracted feature vectors. In the present example however, as shown in FIG. 7, a standard machine learning (ML) generation process 300 is followed, which uses the above-described patch imagification process 200 to create the image database 205. In operation S301, from the image database 205 a training image data set of patches containing known defects, as stored in a defects database 304, is selected. In operation S302 the ML model is trained on the selected training image data set and then evaluated against the defects database 304 in operation S303 until it is determined in operation S303a that optimal results have been achieved. The resulting trained ML model 306 is then ready to be deployed in operation S305 in a defect detection process 400 in a production environment.

Figure 8:
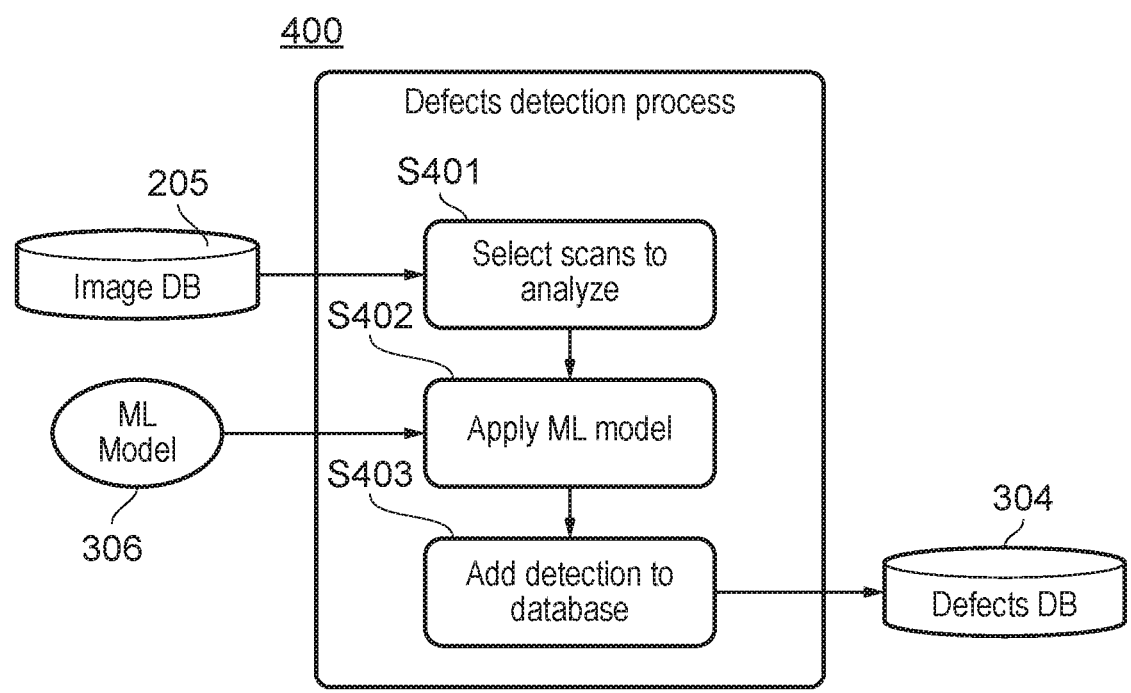
FIG. 8 is a flowchart of a defects detection process used in an embodiment.

In the defect detection process 400 illustrated in FIG. 8, at operation S401 an image stored in the image database 205, which has been obtained using the above-described patch imagification process 200, is selected for analysis. At operation 402 the image is input to the pre-trained ML model 306 to identify defects in the structure or material represented by the image. In operation S403 newly-detected defects are recorded in the defects database 304 for further analysis.

A particular application of an image processing method embodying the present invention will now be described with reference to FIGS. 9 and 10.

For example purposes, we consider a fiberglass pipe 90 as the test object. Fiberglass is widely used in manufacturing of large structures that benefit from being light weight, while having high strength and durability properties. Early applications of fiberglass came from the aviation and aerospace industries for aircraft design. Nowadays, there are many other applications including ship hulls, pipes, surfboards, wind turbine blades, automobile body parts, water slides, pole vaulting poles, among others. Any manufacturing anomalies in such objects can have a significant impact on their structural integrity.

Figure 9:
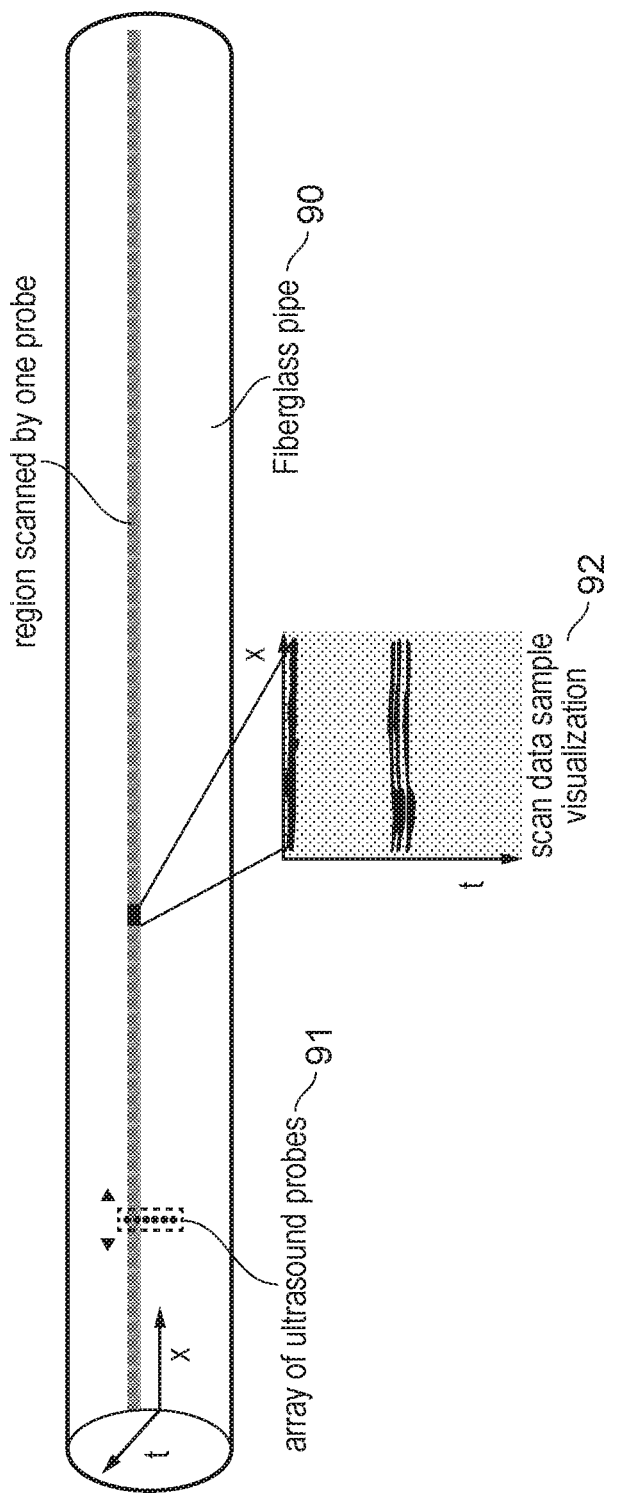
FIG. 9 is a diagram for use in explaining an application of an embodiment.

Ultrasonic NDT scanning is performed by an array of probes 91, which emit sound waves that propagate inside the pipe structure 90 and receive the echoes resulting from interactions with its front and back walls (FIG. 9). The amplitude of the echoes is measured along two dimensions, length x which is measured in a direction parallel to the length of the pipe 90, and time t. The resulting data can be represented as a numerical matrix with echo amplitudes, where each row i corresponds to a given propagation time $t_j$ and each column j corresponds to a given horizontal position xj. As mentioned above, the raw data matrix can be visualised (for example, by mapping a colour gradient to the amplitude values of the echoes (e.g. a gradient from deep blue to dark red), as shown in scan data sample visualisation 92.

The front and back structures of the test object are easily identifiable in the visualisation, since the amplitudes of the echoes they produce usually stand out as dark coloured regions, hence making it easy to inspect for defects. Defects such as wrinkles in the fibreglass layers bring about distinct visual patterns in the scan, such as discontinuities or curvatures in the back structure region.

Figure 10:
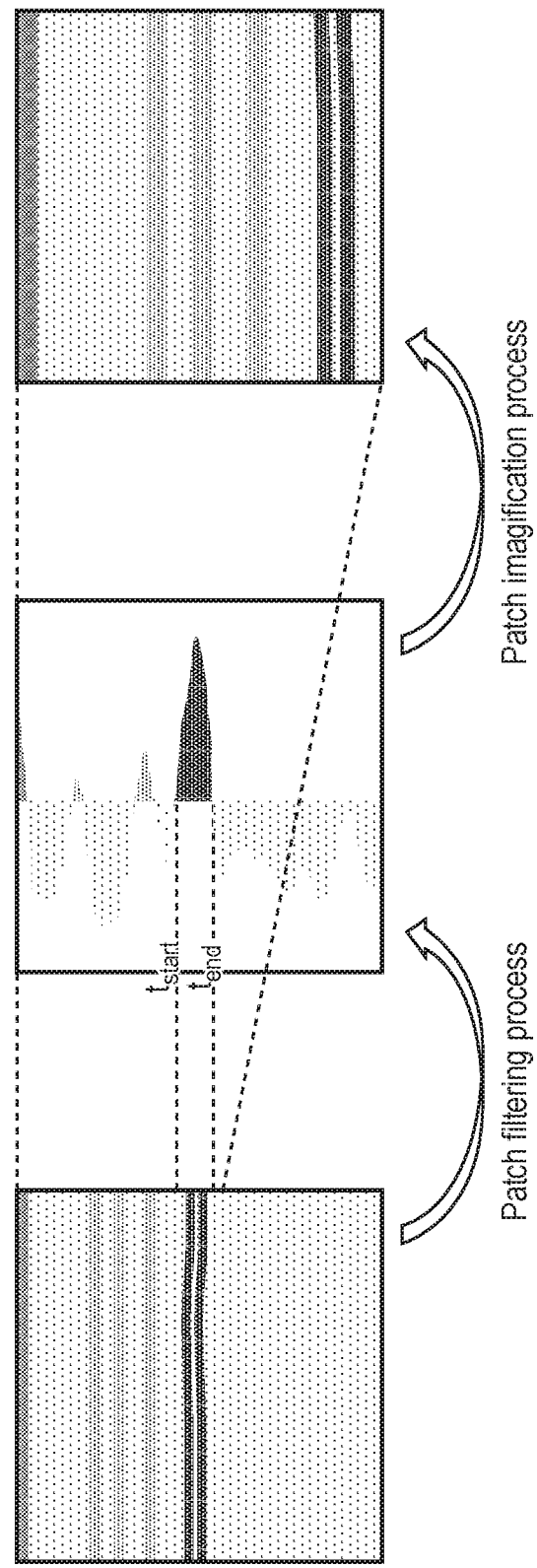
FIGS. 10(a), 10(b) and 10(c) are diagrams for use in explaining the application of FIG. 9.

FIG. 10 illustrates an example of the application of the above-described patch filtering and imagification processes to ultrasound scan data obtained using the set up shown in FIG. 9. FIG. 10(a) shows a visualisation of a portion of raw scan data; front and back structures of the test object are represented in the visualisation by the darkest lines. In this example the raw scan data undergoes the patch filtering process 100 in which sub-matrices are derived from a matrix of the raw scan data and an aggregation function is applied to the echo amplitude values of each sub-matrix to derive respective vectors $v_{patch}$. FIG. 10(b) shows a plot of the values of a vector $V_{patch}$ after the aggregation function has been applied to a sub-matrix. In FIG. 10(b) the darkest portion represents the largest sequence of positive amplitude values over a time period from $t_{start}$ to $t_{end}$, which in this case corresponds to echoes received from the back structure of the test object. A scan threshold value $t_{scan}$ is derived by determining the largest value of $t_{end}$ amongst all the values of $t_{end}$ obtained for the vectors $V_{patch}$. FIG. 10(c) shows a visualisation of the raw scan data after filtering out the unwanted portion of the data using the scan threshold value $t_{scan}$ in accordance with the patch imagification process 200.

Embodiments of the present invention may be implemented in hardware, or as software modules running on one or more processors, or on a combination thereof.

That is, those skilled in the art will appreciate that a microprocessor or digital signal processor (DSP) may be used in practice to implement some or all of the functionality described above.

The invention may also be embodied as one or more device or apparatus programs (e.g. computer programs and computer program products) for carrying out part or all of the methods described herein. Such programs embodying the present invention may be stored on computer-readable media, or could, for example, be in the form of one or more signals. Such signals may be data signals downloadable from an Internet website, or provided on a carrier signal, or in any other form.

Figure 11:
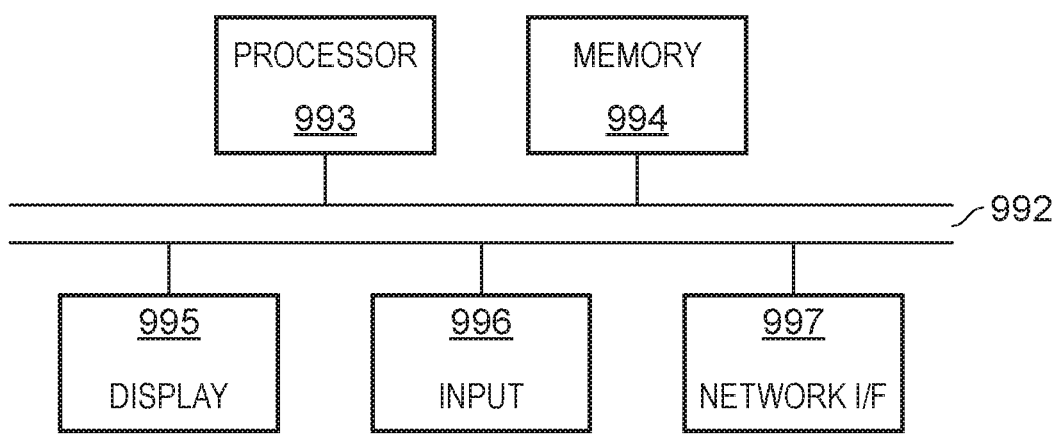
FIG. 11 is a block diagram of a computing device embodying the present invention.

FIG. 11 is a block diagram of a computing device, such as a data storage server, which embodies the present invention, and which may be used to implement some or all of the operations of a method embodying the present invention, and perform some or all of the tasks of apparatus of an embodiment. For example, the computing device of FIG. 11 may be used to implement all the operations of the defect detection method illustrated in FIG. 1A, and perform all the tasks of the ultrasound scan data processor 10 and defect detector 4000 of the defect detection apparatus shown in FIG. 1B, or only to implement some of the operations in the defect detection method of FIG. 1A and only to perform some of the tasks of the defect detection apparatus shown in FIG. 1B.

The computing device comprises a processor 993, and memory, 994. Optionally, the computing device also includes a network interface 997 for communication with other such computing devices, for example with other computing devices of invention embodiments.

For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994, which may for example serve to store $t_{scan}$, the ML model 306, the patch database 104, the image database 205 and/or the defect database 304, may include a computer readable medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing computer program code stored in the memory 994 to implement the methods described with reference to FIGS. 1A, 2, 5, 7 and/or 8 and defined in the claims. For example, such computer program code may implement at least one of: the patch filter 1000, patch visualiser 2000, ML process trainer 3000 and defect identifier 4000 depicted in FIG. 1B and described earlier. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and operations discussed herein.

The display unit 995 may display a representation of data stored by the computing device and may also display a cursor and dialog boxes and screens enabling interaction between a user and the programs and data stored on the computing device. The input mechanisms 996 may enable a user to input data and instructions to the computing device.

The network interface (network I/F) 997 may be connected to a network, such as the Internet, and is connectable to other such computing devices via the network. The network I/F 997 may control data input/output from/to other apparatus via the network.

Other peripheral devices such as microphone, speakers, printer, power supply unit, fan, case, scanner, trackerball, etc. may be included in the computing device.

Methods embodying the present invention may be carried out on a computing device such as that illustrated in FIG. 11. Such a computing device need not have every component illustrated in FIG. 11, and may be composed of a subset of those components. A method embodying the present invention may be carried out by a single computing device in communication with one or more data storage servers via a network. The computing device may be a data storage itself storing at least a portion of the data.

A method embodying the present invention may be carried out by a plurality of computing devices operating in cooperation with one another. One or more of the plurality of computing devices may be a data storage server storing at least a portion of the data.

The above-described embodiments of the present invention may advantageously be used independently of any other of the embodiments or in any feasible combination with one or more others of the embodiments.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof. It will further be understood that the phrase "at least one of A, B and C" may be used herein as an alternative expression that means "one or more of A, B and C."

What is claimed is:

1. A method of detecting a defect in an object, comprising:
obtaining ultrasound scan data derived from an ultrasound scan of the object under consideration, the ultrasound scan data being in a form of a set of echo amplitude values representing amplitude of echoes received from the object during ultrasound scanning at certain spatial and temporal points;
processing the ultrasound scan data to remove echo amplitude values received after a predetermined threshold time;
generating at least one image from the processed ultrasound scan data;
subjecting the generated at least one image to an automated defect recognition process to determine whether there is a defect in a portion of the object represented by the image;

issuing a notification indicating whether a defect has been found; and storing, provided the defect has been found, a result of the automated defect recognition process in a defect database, wherein the method further comprises, before the processing of the ultrasound data, dividing the set of echo amplitude values into a plurality of sub-sets and determining a value of the predetermined threshold time to be used, wherein the determining of the value of the predetermined threshold time comprises:

for a sub-set among the plurality of sub-sets, deriving from amplitude values in the sub-set a vector including a representative amplitude value for each time point in the sub-set;

identifying in the vector an end time point of a largest sequence of positive representative amplitude values; and selecting, from amongst all end time points identified for other vectors, the end time point with a greatest value, or a value calculated using that end time point, as the value of the predetermined threshold time; and wherein the processing of the ultrasound scan data includes removing the echo amplitude values received after the predetermined threshold time from the plurality of sub-sets.

2. The method as claimed in claim 1, wherein the deriving the vector comprises applying a mathematical function including an aggregation function, to amplitude values in the sub-set which correspond to echoes received at the same time.

3. The method as claimed in claim 2, wherein the mathematical function further comprises a smoothing function.

4. The method as claimed in claim 1, wherein the object under consideration is at least one of: a manufactured object; and an object used in manufacture.

5. The method as claimed in claim 1, further comprising using a defect detected in the object to determine at least one of: a structural integrity of material forming at least part of the object; and flaws in material forming at least part of the object.

6. A non-transitory computer readable medium having stored therein a computer program which, when run on a computer, causes the computer to carry out the method as claimed in claim 1.

7. An apparatus to detect a defect in an object, comprising:

an ultrasound scan data processor to process ultrasound scan data derived from an ultrasound scan of the object under consideration, the ultrasound scan data being in a form of a set of echo amplitude values representing amplitude of echoes received from the object during ultrasound scanning at certain spatial and temporal points, the ultrasound scan data processor operating to implement at least:

an amplitude filter to remove from the ultrasound scan data echo amplitude values received after a predetermined threshold time; and an image generator to generate at least one image from filtered ultrasound scan data; and a defect detector to perform the generated at least one image an automated defect recognition process to determine whether there is a defect in a portion of the object represented by the image, issue a notification indicating whether a defect has been found, and store a result of the automated defect recognition process in a defect database provided the defect has been found, wherein the ultrasound scan data processor further operating to implement:

a data sub-set creator to divide the set of echo amplitude values into a plurality of sub-sets, before the processing of the ultrasound scan data by the amplitude filter, and a threshold determiner to determine a value of the predetermined threshold time to be used, wherein the threshold determiner determines the value of the threshold time to be used by:

for a sub-set among the plurality of sub-sets, deriving from amplitude values in the sub-set a vector including a representative amplitude value for each time point in the sub-set;

identifying in the vector an end time point of a largest sequence of positive representative amplitude values; and selecting, from amongst all end time points identified for other vectors, the end time point with a greatest value, or a value calculated using that end time point, as the value of the predetermined threshold time, and wherein the amplitude filter removes the echo amplitude values received after the predetermined threshold time from the plurality of sub-sets.

8. The apparatus as claimed in claim 7, wherein the threshold determiner derives a vector by applying a mathematical function including an aggregation function, to amplitude values in the sub-set which correspond to echoes received at the same time.

9. The apparatus as claimed in claim 8, wherein the mathematical function further comprises a smoothing function.

* * * * *